United States Patent [19]

Bird

[11] Patent Number: 5,341,154
[45] Date of Patent: Aug. 23, 1994

[54] PORTABLE PERSONAL COMPUTER

[76] Inventor: Gregory F. Bird, 2230 S. Woodward, Milwaukee, Wis. 53207-1316

[21] Appl. No.: 815,303

[22] Filed: Dec. 27, 1991

[51] Int. Cl.⁵ .............................................. G09G 3/02
[52] U.S. Cl. .................................... 345/167; 345/184; 345/168; 345/179; 345/173; 364/708.1
[58] Field of Search ............... 340/700, 706, 710, 712, 340/711; 364/708; 341/22; 361/391, 392, 393, 394; 33/1 M; 345/163, 164, 165, 166, 167, 168, 169, 173, 179, 184, 156, 157

[56] References Cited

U.S. PATENT DOCUMENTS

| | | | |
|---|---|---|---|
| 4,500,749 | 2/1985 | Khoshnevis | 33/1 M |
| 4,506,336 | 3/1985 | Hird | 178/18 |
| 4,561,183 | 12/1985 | Shores | 345/163 |
| 4,659,313 | 4/1987 | Kuster et al. | 434/45 |
| 4,709,972 | 12/1987 | LaBudde et al. | 361/391 |
| 4,788,537 | 11/1988 | Potiker | 340/710 |
| 4,933,670 | 6/1990 | Wislocki | 340/706 |
| 4,958,889 | 9/1990 | Boyle et al. | 364/708 |
| 5,006,836 | 4/1991 | Cooper | 345/163 |
| 5,021,771 | 6/1991 | Lachman | 340/709 |
| 5,036,313 | 7/1991 | Lin et al. | 364/708 |
| 5,049,862 | 9/1991 | Dao et al. | 340/706 |
| 5,067,573 | 11/1991 | Uchida | 178/18 |
| 5,103,376 | 4/1992 | Blonder | 364/708 |
| 5,107,401 | 4/1992 | Youn | 364/708 |
| 5,117,378 | 5/1992 | Ho | 364/708 |
| 5,126,724 | 6/1992 | Feuerlein et al. | 340/706 |

FOREIGN PATENT DOCUMENTS 4188208  7/1992  Japan .

OTHER PUBLICATIONS

Article entitled "Touch-and-Feel Interfaces," published by Byte, Feb., 1991.
Brochure entitled "Safari NSX/20 Notebook Computer".
Brochure entitled "Macintosh Powerbook".
Article from the Oct. 1, 1991 issue of *Datamation* entitled "Pen-Based Notebooks Find Their Niche".
Advertisement from Grid Systems Corporation.

Primary Examiner—Alvin E. Oberley
Assistant Examiner—Xiao M. Wu
Attorney, Agent, or Firm—Quarles & Brady

[57] ABSTRACT

A compact computer has a base with an alphanumeric keyboard, and a display screen is pivotally connected to the base. In a stowed configuration the display screen faces against the base with one protective shell extending around the rear of the base and another protective shell extending around the front of the base. The two shells are extended from the base enabling the display screen to be pivoted away from the base into a viewing position. With the shells extended from the base, the display screen also can be pivoted into a position against and facing away from the base. This orientation places the display screen in the tablet mode in which information can be entered into the computer by touching the display screen with a stylus. The base also incorporates a retractable numeric keypad and a three axis track ball assembly.

26 Claims, 4 Drawing Sheets

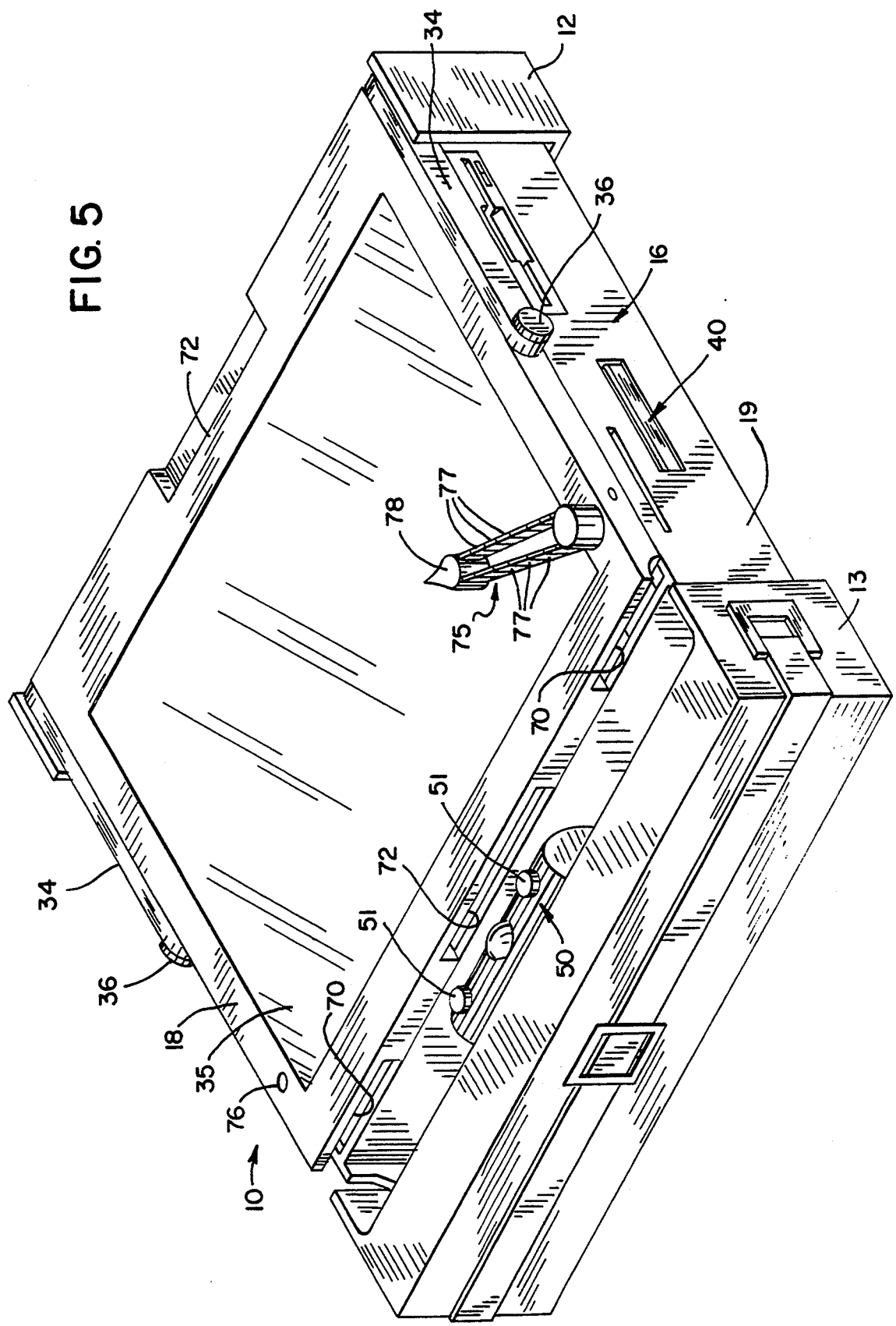

PORTABLE PERSONAL COMPUTER

BACKGROUND OF THE INVENTION

The present invention relates to portable computers, such as those commonly referred to as laptop or notebook computers; and specifically to data input devices for use with portable computers and means for protecting such input devices while transporting the computer.

Computers have evolved from room-sized apparatus to desktop personal computers and then to devices which have a size similar to a three-ring notebook. In reducing the computer to a portable size, certain input devices commonly associated with larger computer systems were combined in order to provide a more compact device. For example, desktop computers often had a trackball mechanism that the user manipulated to move a cursor on the display screen of the personal computer or terminal. A track ball has a sphere which is rolled in a socket by the fingers of a user and which engages a pair of wheels which rotate as the sphere is manipulated. The wheels are coupled to a potentiometer having a resistance that varies with the movement of the ball. The axes of the wheels are perpendicular to each other so that the potentiometers produce signals representing movement in two dimensions. These signals are used to position a cursor on the display screen. In some trackballs, slotted wheels are driven by the movement of the sphere and interrupt a beam of light in an electro-optic device, which produces a pulsed electrical signal that is used to position a cursor. Similarly, the numeric keypad usually found on full size desktop keyboards was eliminated from many portable computer keyboards to save space. As a result, standalone keypads are available as after market input peripherals.

Another input mechanism includes a transparent conductive coating on the outer surface of the display screen. The user touches the display screen with an electrically conductive stylus to indicate a particular position on the display screen. The stylus coming into contact with the surface of the display screen alters an electrical characteristic of the coating, enabling the point of contact to be sensed by detection circuitry. An example of this type of input mechanism is described in U.S. Pat. No. 4,129,747. Similar stylus devices have been used with a flat horizontal tablet onto which the user can enter graphical or handwritten information which is stored as an image in the computer system.

In addition to combining certain components in the course of designing portable computers, those components were densely packaged into as small a case as possible. The case itself was made as light as possible to facilitate portability. These factors make the components of the computer susceptible to damage when the case is dropped or jarred forcibly. Portable computers commonly are carried in cushioned bags which offer some degree of additional protection. However, such bags increase the bulk of the package being carried as well as creating a separate item which must be stored when the computer is being used. It is therefore desirable to provide elements which increase the resistance of the computer to damage while remaining integrated with the basic case.

The reduced size of the portable computer often produced discomfort for the user's hands and wrists while using the keyboard. This led to a need to provide a rest for the hands of the operator at the same level as the top of the keyboard. Placing a separate rest in front of the keyboard or moving the keyboard backward on the computer case has addressed this need.

SUMMARY OF THE INVENTION

A personal computer has a base with an alphanumeric keyboard on an upper surface and with front and rear sides. A housing is pivotally connected adjacent the rear side of the base and includes a screen for the display of alphanumeric and graphic characters. The computer has a stowed configuration in which the housing is folded against the base with the display screen facing the upper surface. In one operating position, the housing is pivoted away from the base in order for a user to view the display screen and enter information into the keyboard.

A track ball assembly is removably coupled to the base and includes an elongated track extending across the front side of the base. A carriage is attached to and is moveable along the track. A sphere extends through and is rotatable within an aperture in the carriage. A means is provided to produce electrical signals indicative of rotational movement of the sphere about two axes and indicative movement of the carriage along the track. A manually operable electric switch is mounted on the carriage. A conductor mechanism is included to carry the electrical signals between the carriage and the base.

The personal computer also has a shell moveably coupled to the front side of the base. In the stowed configuration, the shell extends over the front of the housing and the track ball assembly, whereas in the operating position the shell extends from the front side of said base to permit access to said track ball assembly. This shell in the operating position also acts as a rest for the user's hands while entering data into the keyboard. Another shell preferably is provided to extend over and protect the rear side of the base in the stowed configuration. The shells may extend downward from the base in the operating position to form a stand for the computer.

The preferred embodiment of the present computer has a mechanism by which the housing is attached to the base so that the housing can be folded against the base with the display screen facing away from the base. For this embodiment a means is provided by which information can be entered into said computer by touching the display screen with an object. A stylus is included with which to touch the display screen. Other input devices such as a retractable numeric keypad with a handrest also may be incorporated into the personal computer.

An object of the present invention is to improve a portable computer by combining additional input devices in the computer case. Such additional input devices include a track ball assembly for entering three-dimension position information; and a built-in stylus for entering data by touching the stylus to the display screen. The computer also includes a numeric keypad which mounts onto one side of the base in an operating position and is retracted into the case when not in use and during transportation of the computer.

Another object is to provide a display screen which can be oriented in one position for reading by the user while entering data via the keyboard or track ball, or the display screen can be tilted into a horizontal position with the display screen facing upward for use as a stylus tablet.

A further object of the present invention is to provide elements attached to the computer case which protect the different input mechanisms and other components while transporting the computer. Specifically, shells extend over edges of the case during transportation, but are moved outward to enable the computer to be opened for use. The shells also form a stand and a hand rest during the operating mode.

BRIEF DESCRIPTION OF THE DRAWINGS

FIG. 5 is an isometric view of the computer with the display screen oriented in the tablet mode and the front shell in a hand rest position.

DETAILED DESCRIPTION OF THE INVENTION

Figure 1:
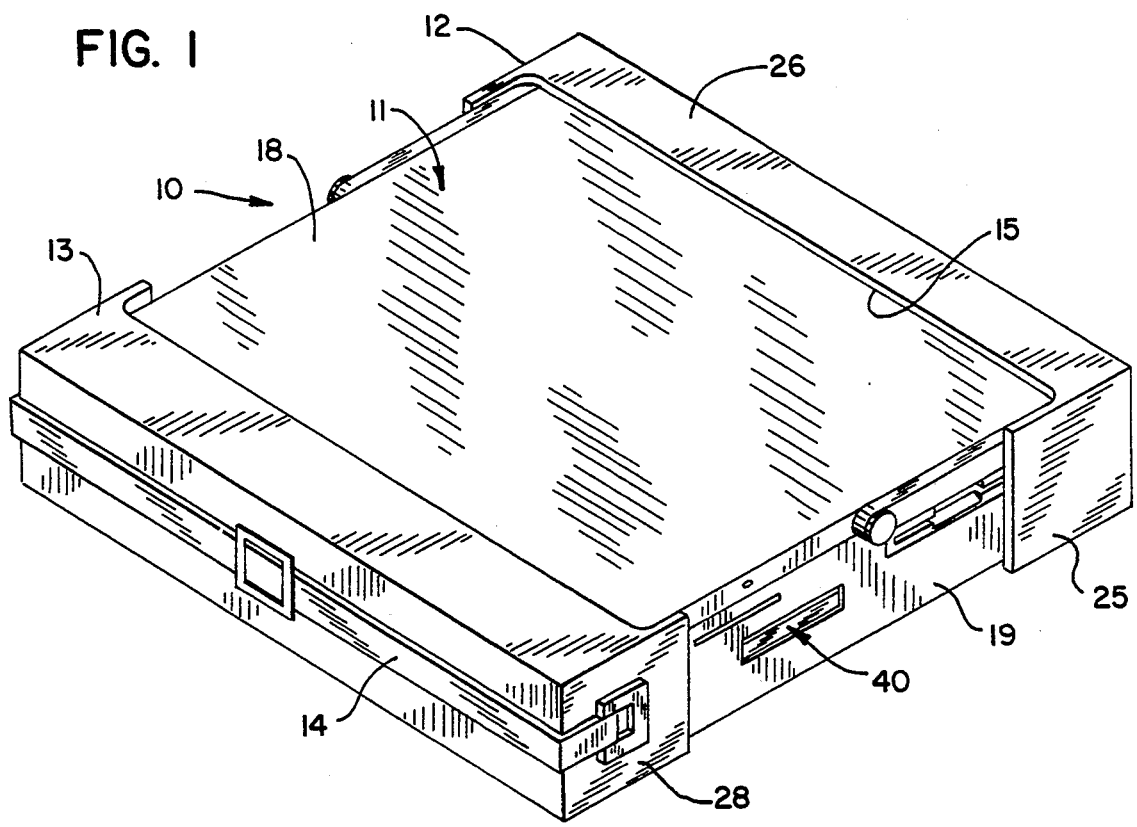
FIG. 1 is a pictorial view of a portable computer according to the present invention closed for transporting.

With initial reference to FIG. 1, a computer 10 includes a case 11 which when closed has a rectilinear shape. Two shells 12 and 13 wrap around edges of the case. The shells 12 and 13, referred to respectively as rear and front shells based on their position relative to a user, have an open box-like shape with the housing extending into the opening of each shell. When the computer is to be transported, the shells are slid over the front and rear sides of the housing into positions illustrated to protect the sides of the case 11. The shells are made of relatively flexible plastic with a gap existing between the shell and the case in the closed state so that the shells will absorb impact forces if the computer is dropped. As will be described, the shells are movable outward from the case to enable the computer to be opened in an operating mode shown in FIG. 2. An adjustable strap 14 is attached to the sides of front shell 13 to enable the user to carry the computer with ease. In the stowed configuration, the strap 14 may extend and attach to the rear shell 12 as well as the front shell 13, thereby keeping the case closed.

Figure 2:
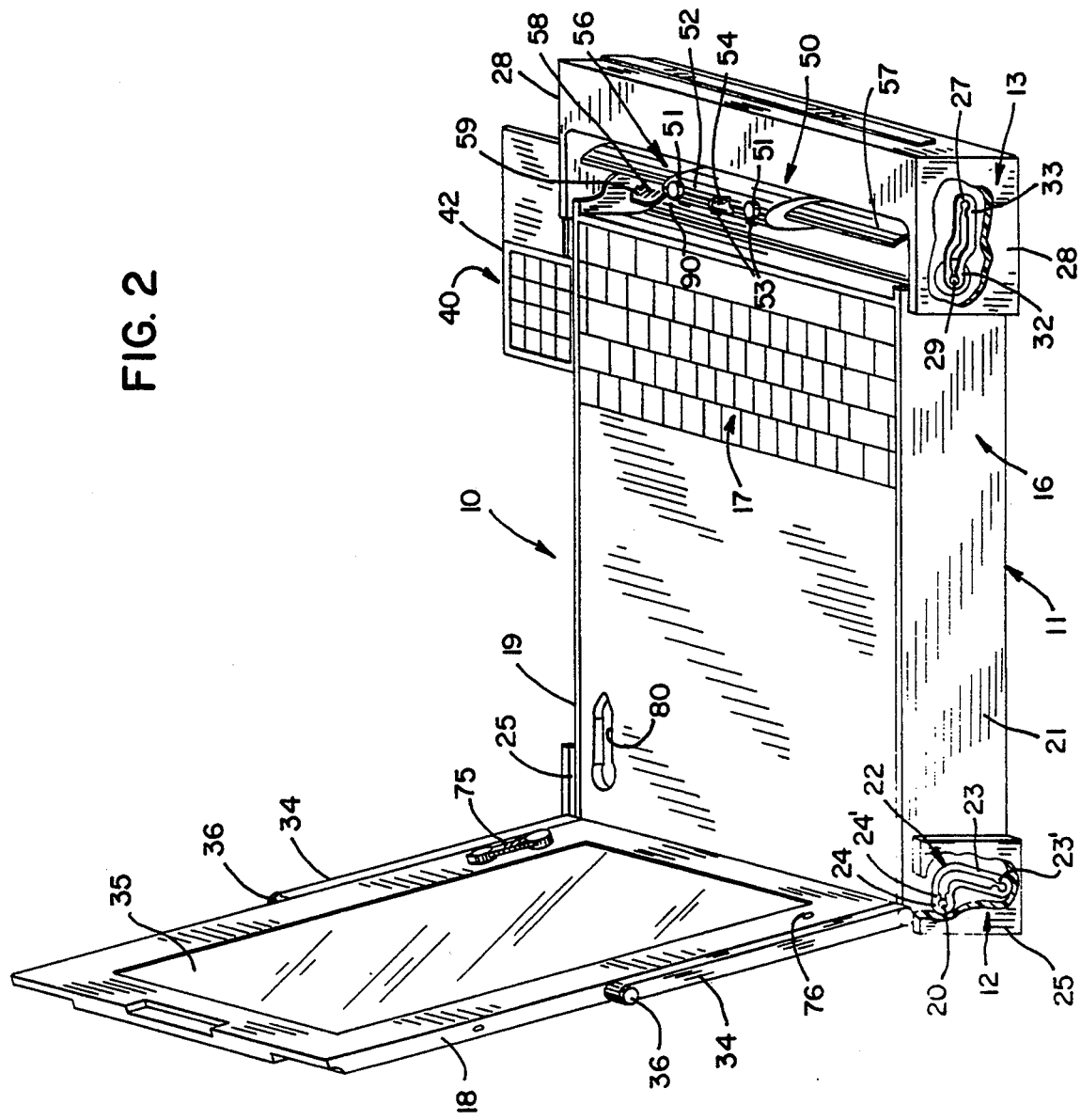
FIG. 2 is an isometric view of the personal computer in an opened position for entry of data using the keyboard, numeric keypad and track ball assembly.

With reference to FIG. 2, the computer case 11 comprises a base 16 and a screen housing 18. The base 16 contains microprocessor circuitry, memory devices, and a keyboard 17. The screen housing 18 is illustrated in the upright position for viewing by the user. The screen housing 18 has a conventional display screen 35, such as a liquid crystal display, onto which the computer presents alphanumeric and graphic information. A pair of hollow arms 34 are attached at one end to the middle of opposite sides of the screen housing 18 by pivots 36. The other ends of the arms 34 are pivotally connected to the base 16. Wires pass through the hollow arms 34 to carry electrical signals between the base 16 and the screen housing 18. The pivots incorporate electrical couplings between these wires and conductors in the screen housing. An example of one type of pivotal coupling is described in U.S. Pat. Nos. 4,864,523 and 4,986,763.

Portions of the rear and front shells 12 and 13 have been cut away in FIG. 2 to expose the mechanism by which the shells are attached to the base 16 of the computer. Two rectangular pins 20 extend from opposite sides 19 and 21 of the base 16 near the rear edge. Each first pin 20 engages a closed guide track 22 on the inner surface of side walls 25 of the rear shell 12. This guide track may be a separate structure attached to the shell or may be formed by a groove cut in the shell's inner surface. The guide track 22 is generally L-shaped, having a long leg 23 and a short leg 24. When the computer 10 is in the stowed configuration illustrated in FIG. 1, the first pins 20 are located within the long section 23 of the guide track 22. In this configuration, the rear shell 12 wraps around the rear of the case 11 with a small transverse plate 26 extending over the screen housing 18.

As part of opening the computer case, the rear shell 12 is slid away from the case 11. During this movement, the longer leg 23 of the track moves on the pin 20 until the pin reaches the junction of the two legs 23 and 24. At this location, the rear shell 12 can be rotated ninety degrees downward and slid back toward the computer until the pin 20 is positioned at the end of the short leg 24 as shown in FIG. 2. This orientation, the rear shell 12 exposes the upper surface of the screen housing 18 enabling it to be tilted upward into the illustrated position. The rear shell 12 in this configuration forms a rear stand which supports the computer case 11. A notched region 15 of the transverse plate 26 of shell 12 provides access to the connectors for I/O ports at the rear of the base 16.

The front shell 13 also has a separate closed track 27 located on the inner surface of each of the side walls 28 of the front shell. The tracks 27 of the front shell 13 have generally dog-legged shapes and engage a rectangular pin 29 which extends from the associated side 19 or 21 of the base 16. FIG. 2 illustrates the front shell in the extended state where it is moved outward from the base 16. In this position, the front shell 13 has dropped down so that its upper surface 30 is substantially flush with the keyboard 17 of the base 16. Surface 30 of the front shell 13 provides a rest for the user's hand while operating the computer. In this downward, extended configuration, the front shell 13 provides a stand at the front of the base 16. The front shell 13 can pivot slightly about pins 29 enabling the shell to lie flat on the surface supporting the computer.

In the stowed state shown in FIG. 1, the screen housing 18 folds flat over the keyboard 17, and the front shell 13 is slid over the case 11. As this sliding movement occurs, the dogleg tracks 27 cause the front shell 13 to ride upward and over the front edges of the base 16 and screen housing 18. In the stowed state, the front shell wraps around the front edge of the computer case 11. The front shell 13 has a plate which forms upper surface 30 and which extends over the screen housing 18. A similar plate is located on the shell beneath the case. The front shell 13 protects the front of the case 11 in this state.

Each track 27 of the front shell 13 has two pairs of inwardly extending projections 32 and 33, the dimensions of which have been exaggerated for illustration purposes. The projections 32 and 33 form narrow passages which captivate the pin 29 at each of the extreme positions along the track. One set of projectors 32 lock the front shell 13 into place in the operating position, preventing the base 16 from sliding inadvertently along the track due to vibration from the user's hand during use of the computer. Similarly, the other set of projections 33 lock the front shell in the stowed state, which enables the user to hold the computer 10 by strap 14 without sliding the front shell. By exerting force on the front shell 13 while holding the case 11, the user can move the pins 29 between a pair of projections 32 or 33 to reposition the shell.

Figure 3:
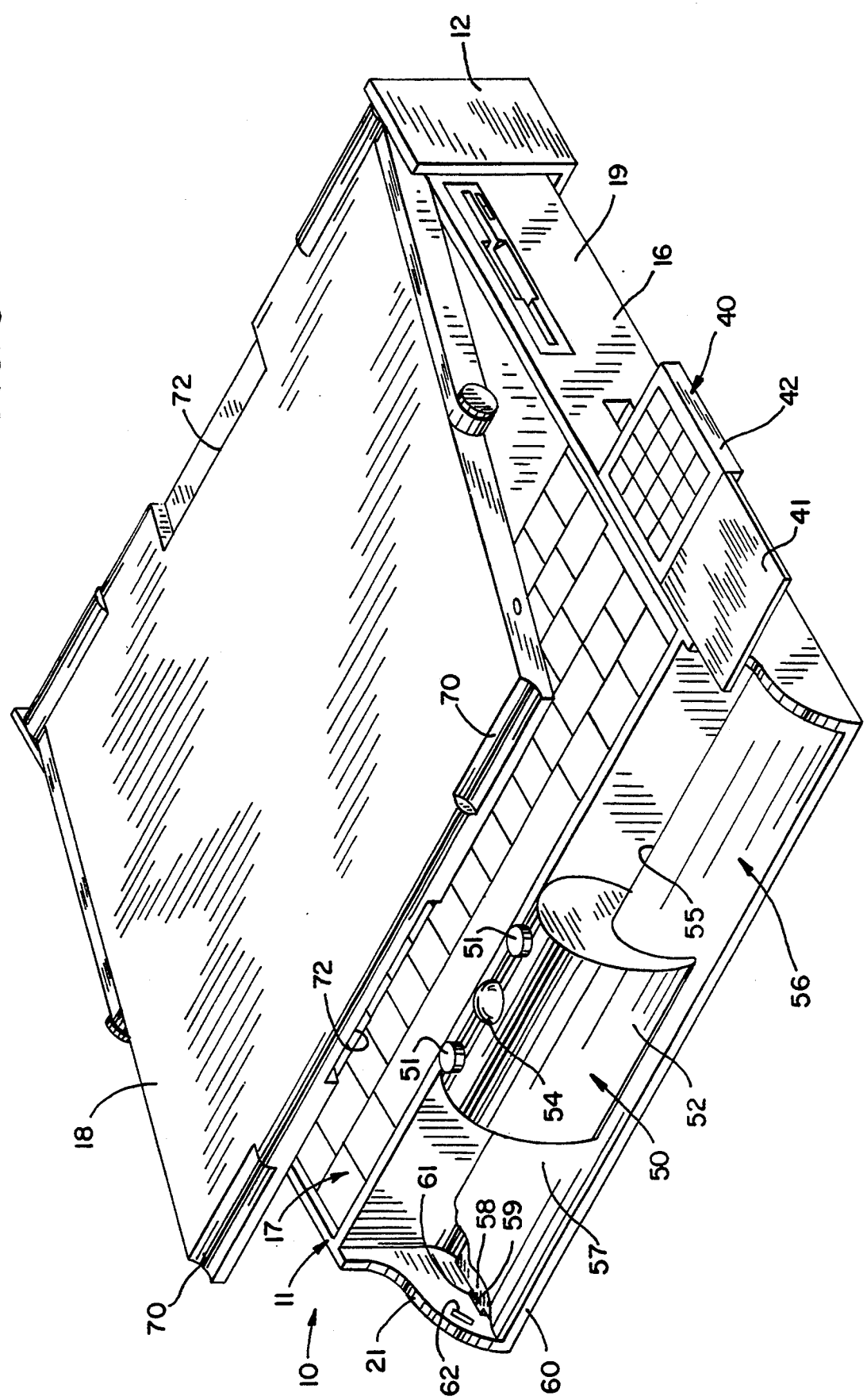
FIG. 3 is an isometric view from the front of the computer with the front protective shell removed to illustrate the track ball assembly in a stowed state and the keypad in the operating position.

In addition to keyboard 17, the base 16 includes a numeric keypad 40, as shown in FIGS. 2 and 3. The keypad has a body 42 which can be attached by a projection (not shown) to project from one side 19 of the base 16. A cover 41 is hinged at the front of the keypad body 42 and unfolds to form a hand rest when the keypad is attached to the side of the case. In the stowed configuration, the cover 41 is folded over the body 42 and the keypad 40 is slid into a pocket in the base 16 as shown in FIG. 5.

The base 16 also contains a track ball assembly 50, as illustrated in FIG. 3 in which the front shell 13 has been removed. The track ball assembly 50 comprises a carriage 52 which has a sphere 54 extending through an opening in the upper surface of the carriage. Several pushbutton switches 53 are located on the surface of the carriage 52 which faces toward the keyboard 17 as shown in FIG. 2. Additional pushbutton switches 51 are located on the upper surface of the carriage on either side of the sphere 54. The track ball carriage 52 is mounted over an edge 55 of a track 56 which extends across the front of base 16.

To operate the track ball assembly 50, the user grasps the carriage 52 by placing a thumb on or adjacent to the sphere 54 and other fingers adjacent the pushbuttons. Because the pushbuttons are located on a section of the curved carriage surface opposite the sphere 54, the user pinches the carriage 52 between the fingers. Grasping the track ball assembly 50 in this manner permits the user to manipulate the sphere 54 to move the cursor about the display screen. A pushbutton switch 53 is activated to indicate when the cursor is properly positioned. For example, the signal from the pushbutton switch selects an item being displayed at the location where the cursor is pointing. The carriage is moved laterally along the track 56 to provide a third axis input. While manipulating the track ball carriage 52, the user may rest a hand on surface 30 of the front shell 13, which when extended from the case 11 creates a gap in which to operate the track ball assembly 50.

Figure 4:
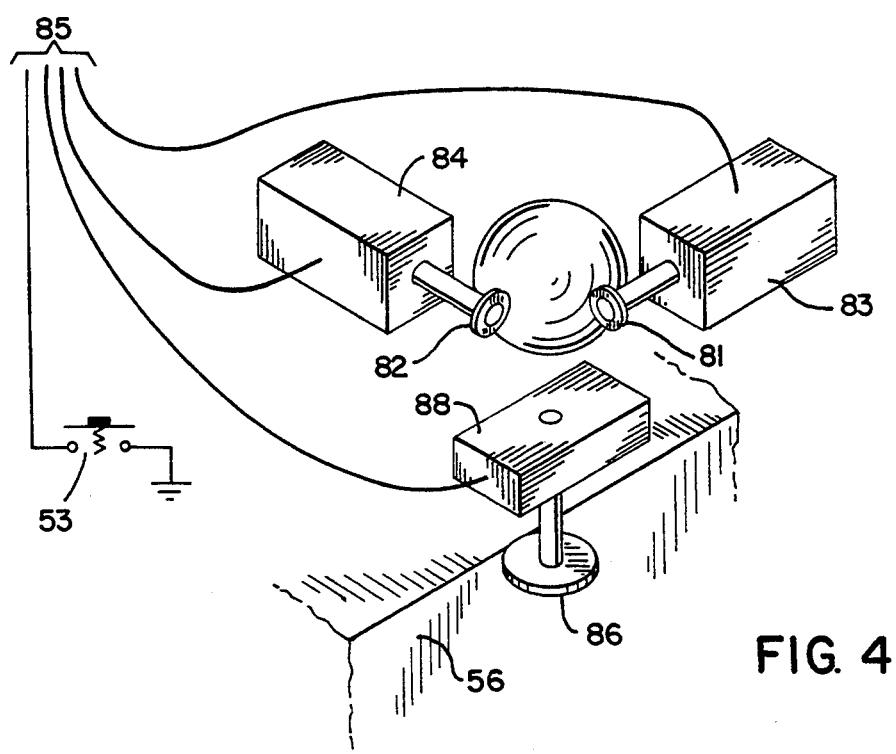
FIG. 4 is a schematic representation of the circuitry inside the track ball assembly.

A conventional mechanism is contained in the carriage 52 which responds to rotation of the sphere 54 or movement of the carriage by producing electrical signals indicative of that action. One type of such a mechanism 80 is illustrated schematically in FIG. 4. A pair of wheels 81 and 82 engage the surface of the sphere 54 so that the wheels rotate as the sphere is moved. The wheels 81 and 82 are mounted on perpendicularly oriented axes so that the rotation of each wheel corresponds to movement along one of two orthogonal coordinates. Each wheel 81 or 82 is connected by a separate shaft to a transducer 83 or 84 which converts the mechanical rotation into an electric signal. For example, the transducers can be a potentiometer or an electro-optical device.

A third wheel 86 is mounted within the carriage 52 to engage a surface of the track 56 so as to rotate as the carriage is moved laterally along the track. This latter wheel 86 is connected to a third transducer 88 which produces an electric signal indicative of that lateral movement. This signal provides a third axis of input enabling the track ball assembly 50 to provide an indication of movement in three dimensions.

The transducer signals are carried by wires 85 to circuitry in the base 16. The wires are stored in a cavity 90 in the front shelf 60 of the base 16 as shown in FIG. 2.

As shown in FIGS. 2 and 3, the track 56 has an elongated, curved section 57 on which the carriage 52 rides. The carriage has a U-shaped cross section with a curved central opening that conforms to the curvature of track section 57. Each end of the track 56 has a short foot 58 extending inwardly from the lower edge of the curved section 57. One foot 58 is illustrated in the cut away section at the left end of the track in FIG. 3.

The front of the computer base 16 has a shelf 60 on which the track ball assembly 50 rests. The track 56 can be tilted into different positions on that shelf. When the feet 58 of the track 56 are flat against the base shelf 60 as shown in FIG. 3, the carriage 52 is in a stowed position where it rests against the front of the base 16. In this position, a tab 59 on each foot 58 engages a first notch 61 in the inside surface of each side wall 19 and 21 of the base 16 to lock the track ball assembly 50 in place. The track 56 is fabricated from a relatively flexible plastic material, for example. This enables the track 56 to be flexed so as to remove the tab 59 from engagement with the notch 61 allowing the track ball assembly 50 to be pivoted from shelf 60. The track ball assembly is pivoted into an operating position where the tabs 59 at the ends of the track 56 engage a second pair of notches 62 in base side walls 19 and 21. In this second position the track ball assembly 50 is tilted outward from the base 16. This action not only raises the track ball carriage, but also creates a space between the carriage 52 and the base 16 exposing the pushbutton switches 53 and creating a space within which the user can place fingers. Engagement of tabs 59 with the second pair of notches 62 locks the track ball assembly in the operating position.

The track ball assembly 50 is a self contained unit which is separate from the base 16 of the computer. Not only can the track ball assembly be pivoted on shelf 60 of base 16, the track ball assembly can be removed from the shelf and positioned on a table surface adjacent to the computer case 11. The carriage 52 also can be removed from the track 56 and used as a standalone track ball device. This enables the track ball assembly 50 or just the carriage 52 to be used at other orientations with respect to the computer than those illustrated in FIGS. 2 and 3.

In addition to placing the display screen in the position illustrated in FIG. 2, the screen housing 18 may be rotated against the base 16 with the display screen 35 facing upward as illustrated in FIG. 5. In order to place the display screen 35 into this position, the screen housing is first placed into a orientation near that illustrated in FIG. 2. The pivots 36 are operated to unlock the housing 18 from the arms 34. Then the screen housing 18 is rotated 180 degrees about the pivots 36. As shown in FIGS. 3 and 5, the screen housing 18 has depressions 70 at each corner in which the lower screen arm pivots nest. This allows the housing 18 to fit coplanar with the arms 34. Central depressions 72 along opposing edges of the screen housing 18 allows that housing to close over the track ball assembly 50. After the display screen has been rotated about pivots 36, the screen housing 18 and arms 34 are tilted into the flat position against the base 16 that is illustrated in FIG. 5. This position places the computer 10 into a mode in which the display screen can be used as a tablet for entering data.

In this configuration, a stylus 75 attaches to a pivot point on the screen housing 18 adjacent one edge of the display screen 35. The stylus 75 can be rotated about the pivot point enabling it to touch to any location on the display screen. The stylus comprises a number of interlocking slidable elements 77 enabling the stylus to extend or contract so that the stylus tip 78 can touch any point on the surface of display screen 35. The tip 78 of the stylus has a tear-drop share with a point that has a marking element of the stylus. The stylus tip 78 can swivel at the ends of the slidable elements 77.

When not in use, the elements are contracted together and the stylus 75 is placed parallel to the display screen where it will nest in a depression 80 in the base 16 (FIG. 2) when the case 11 is in the stowed configuration. A second pivot point 76 is provided on which a left-handed user can mount the stylus 75.

The stylus 75 is conductive, providing an electrical path between the location on the display screen 35 touched by tip 78 and the pivot point 76. The outer surface of display screen 35 has a transparent electrically conductive coating applied to it which enables detection of the point of contact with the stylus using any of several well known techniques, such as the one described in U.S. Pat. No. 4,129,747.

The stylus tip 78 is made of flexible material and has an internal electrical switch. The contacts of the stylus switch become closed when the tip 78 is squeezed between opposing fingers of the user. The stylus switch is connected by conductors running through the stylus 75 to an electrical connector within pivot point 76. The closure of the switch in the stylus tip provides an electrical signal which can be used to indicate the selection of a particular point on the display screen by the user.

By touching the stylus tip 78 to the display screen 35, the user is able to select an item from a menu being displayed, for example. Alternatively, the stylus can be manipulated like a pen to enter graphical information into the computer 10.

I claim:

1. A portable personal computer comprising:
   a base having an alphanumeric keyboard on an upper surface and having front and rear portions;
   a screen housing pivotally connected to the rear portion of said base and having a display screen for displaying alphanumeric characters, said computer having a stowed configuration in which said screen housing abuts said base with the display screen facing the upper surface of said base;
   a first shell moveably coupled to and extending around the rear section of said base when said computer is in the stowed configuration; said first shell being extendable from the rear section when the screen housing is positioned away from the upper surface of said base; and
   a second shell moveably coupled to and extending around the front section of said base and over a front section of said screen housing in the stowed configuration; said second shell being extendable from the front section of said base to permit pivoting of said screen housing away from the upper surface of said base.

2. The portable personal computer as recited in claim 1 wherein said base further comprises a numeric keypad which in one orientation extends from said base adjacent to the keyboard and in another orientation is stowed in a pocket in said base.

3. The portable personal computer as recited in claim 1 wherein said base includes a pair of pins extending from opposing sides, each such pin engaging a separate track of said first shell, said pins and tracks guiding movement of said first shell with respect to said base.

4. The portable personal computer as recited in claim 3 wherein said first shell when extended from said base can be pivoted with respect to said base to form a rear stand of said computer.

5. The portable personal computer as recited in claim 1 wherein said base includes a pair of pins extending from opposing sides and engaging a separate track of said second shell, said pins and tracks guiding movement of said second shell with respect to said base.

6. The portable personal computer as recited in claim wherein each track has a dog-leg shape guiding said second shell into a position when extended from said base to form a front stand of said computer.

7. The portable personal computer as recited in claim 1 wherein one of said first or second shells has an adjustable strap attached thereto.

8. The portable personal computer as recited in claim 1 further comprising a track ball assembly coupled to the front portion of said base, said track ball assembly comprising:
   an elongated track;
   a carriage mounted on and moveable along said track with a rotatable sphere, and including means for producing electrical signals indicative of rotational movement of said sphere about two axes and movement of said carriage along said track; and
   conductors extending between said carriage and said base to carry the electrical signals therebetween.

9. The portable personal computer as recited in claim 8 wherein said carriage further includes an electric switch that is operable by a user of said computer.

10. The portable personal computer as recited in claim 8 wherein said second shell encloses said track ball assembly in the stowed configuration of said computer.

11. The portable personal computer as recited in claim 8 wherein said track ball assembly can pivot into a nesting position against said base which enables said second shell enclose said track ball assembly in the stowed configuration, and into a second position at which a user is able to manipulate said track ball assembly.

12. A portable personal computer comprising:
    a base having an alphanumeric keyboard on an upper surface and having front and rear sides;
    a screen housing pivotally connected adjacent the rear side of said base and having a display screen for displaying alphanumeric characters, said computer having a stowed configuration in which said screen housing abuts said base with the display screen facing the upper surface;
    a track ball assembly coupled to said base and including an elongated track extending across the front side of said base, and a carriage moveable along the track and having a rotatable sphere, and including means for producing electrical signals for three axes of movement indicative of rotational movement of the sphere about two axes and indicative movement of the carriage along the track for a third axis; and means for carrying the electrical signals between the carriage of said track ball assembly and said base.

13. The portable personal computer as recited in claim 12 wherein said carriage further includes an electric switch located on a side of said carriage which faces the front side of the base.

14. The portable personal computer as recited in claim 12 further comprising a shell moveably coupled to and extending around the front side of said base and over said track ball assembly when said computer is in the stowed configuration; said shell being extendable from the front side of said base to permit access to said track ball assembly.

15. The portable personal computer as recited in claim 14 wherein said track ball assembly can pivot into a first position against said base which enables said shell to enclose said track ball assembly in the stowed configuration, and into a second position at which a user is able to manipulate said track ball assembly.

16. The portable personal computer as recited in claim 15 wherein said track includes a tab located at each end with each tab engaging notches in said base to hold said track ball assembly in the first and second positions.

17. The portable personal computer as recited in claim 12 wherein said track ball assembly is removeable from engagement with said base and is operable in a removed state.

18. The portable personal computer as recited in claim 12 wherein the carriage is removeable from engagement with the track and is operable in a removed state.

19. An input device for a personal computer comprising:
   an elongated track;
   a carriage moveably attached to said track;
   a sphere extending through an aperture in one section of a surface of said carriage and rotatable therein;
   a means for producing electrical signals for three axis of movement indicative of rotational movement of said sphere about two axes and indicative of movement of said carriage along said tract for a third axis;
   an electrical switch positioned on another section of the surface of said carriage such that the sphere and switch are operable by a pinching the switch and the one surface between fingers of a user's hand; and
   means for carrying the electrical signals between the carriage and the personal computer.

20. The input device for a personal computer as recited in claim 19 further comprising means for attaching said track to a case of the personal computer.

21. A portable personal computer comprising:
   a base having an alphanumeric keyboard on an upper surface and having front and rear sides;
   first and second arms each having one end pivotally connected to said base adjacent the rear side;
   a housing having a display screen for displaying alphanumeric characters, said housing connected to said first and second arms in a manner that enables said housing to be rotated 180 degrees about points of that connection, said computer having a stowed configuration in which said housing abuts said base with the display screen facing toward the upper surface, and a tablet data entry configuration in which said housing lies flat against the upper surface of said base with the display screen facing away from the upper surface; and
   a means for entering information into said computer by touching the display screen with an object.

22. The portable personal computer as recited in claim 21 wherein said means for entering information comprises a stylus with which to touch the display screen.

23. The portable personal computer as recited in claim 21 wherein said base further comprises an numeric keypad extending from said base adjacent to the keyboard and retractable into said base.

24. The portable personal computer as recited in claim 23 wherein said numeric keypad comprises a body; and a hand rest adapted to project from said body when said keypad extends from said base, and retractable with respect to said body when said numeric keypad is retractable into said base.

25. The portable personal computer as recited in claim 21 further comprising:
   a track ball assembly coupled to said base and including an elongated track extending across the front side of said base, a carriage with a rotatable sphere and being moveable along said track, and a means for producing electrical signals indicative of rotational movement of said sphere about two axes and indicative of movement of said carriage along the track; and
   conductor means extending between the carriage of said track ball assembly and said base to carry the electrical signals therebetween.

26. The portable personal computer as recited in claim 21 further comprising:
   a first shell moveably coupled to and extending around the rear side of said base when said computer is in the stowed configuration, and being extendable from the rear side when said housing is pivoted away from the upper surface of said base; and
   a second shell moveably coupled to said base and extending around the front side, said second shell extending over a front edge of said housing when said computer is int he stowed configuration.

* * * * *